(12) United States Patent
Hiller (10) Patent No.: US 8,750,727 B1
(45) Date of Patent: Jun. 10, 2014

(54) WAVE ENERGY-BASED COMMUNICATION

(75) Inventor: Nathan D. Hiller, Fallbrook, CA (US)

(73) Assignee: The Boeing Company, Chicago, IL (US)

( * ) Notice: Subject to any disclaimer, the term of this patent is extended or adjusted under 35 U.S.C. 154(b) by 347 days.

(21) Appl. No.: 13/069,649

(22) Filed: Mar. 23, 2011

(51) Int. Cl.
*H04B 10/06* (2006.01)
*H04B 10/00* (2013.01)

(52) U.S. Cl.
USPC .......................... 398/212; 398/118; 398/214

(58) Field of Classification Search
USPC .................................. 398/118–131, 202–214
See application file for complete search history.

(56) References Cited

U.S. PATENT DOCUMENTS

| | | | | |
|---|---|---|---|---|
| 3,056,131 A | * | 9/1962 | McCreary | 343/781 R |
| 4,394,780 A | * | 7/1983 | Mooradian | 398/125 |
| 5,038,406 A | | 8/1991 | Titterton et al. | |
| 2003/0169489 A1 | * | 9/2003 | Jiang et al. | 359/341.5 |
| 2004/0052278 A1 | * | 3/2004 | Kane et al. | 372/25 |
| 2005/0207757 A1 | * | 9/2005 | Okuno | 398/85 |
| 2008/0225914 A1 | * | 9/2008 | Gurusami et al. | 372/38.02 |
| 2009/0142069 A1 | * | 6/2009 | Wree et al. | 398/147 |
| 2009/0158878 A1 | | 6/2009 | Clayton et al. | |
| 2010/0018595 A1 | | 1/2010 | Clayton et al. | |
| 2010/0277384 A1 | | 11/2010 | Gierow et al. | |
| 2011/0030675 A1 | * | 2/2011 | King et al. | 126/634 |

OTHER PUBLICATIONS

Dutton, Understanding Optical Communications, International Technical Support Organization, Sep. 1998, IBM Corporation, (638 pgs).

* cited by examiner

*Primary Examiner* — Daniel Dobson
(74) *Attorney, Agent, or Firm* — Toler Law Group, PC (57) ABSTRACT

A particular method includes directing wave energy toward a collection region inside a collector by receiving the wave energy from outside the collector through an at least partially transparent portion of the collector and reflecting the wave energy toward the collection region using an at least partially reflective portion of the collector. The method also includes receiving the wave energy at a receiver disposed in the collection region.

20 Claims, 8 Drawing Sheets

WAVE ENERGY-BASED COMMUNICATION

FIELD OF THE DISCLOSURE

The present disclosure is generally related to wave energy-based communication.

BACKGROUND

Communication with underwater vehicles presents challenges due to attenuative properties of water. Since some types of signals tend to attenuate significantly in water, communication systems that rely on such signals may have relatively short operational ranges, relatively low bandwidth capacity, or require large power. For example, sonar and other sound-based communication techniques may suffer from relatively low bandwidth capacity.

To avoid issues with signal attenuation in free-space (i.e., using water as a communication medium) a tether that includes a communication medium, such as wires or optical fiber, may be used. The tether may connect an underwater vehicle to a receiving system. The communication medium may reduce signal attenuation; however, the tether may limit range and mobility of the underwater vehicle.

SUMMARY

A communication system capable of real-time, high-bandwidth communications between an underwater vehicle and a receiving system is provided. The communication system may utilize an omni-directional or multidirectional signal collector. For example, the signal collector may collect wave energy, such as light, (bearing a communication signal) from multiple directions and direct the wave energy to a receiver. The receiver may include a water-to-fiber interface that facilitates transferring the wave energy from propagating in water to propagating in a wave guide or another transmission medium, such as an optical fiber. The signal collector and receiver may be deployed in an area where the underwater vehicle is in operation and may be tethered to the receiving system via the wave guide. The underwater vehicle may transmit data to the receiving system, via the signal collector, the receiver, and the wave guide. This communication system may enable the underwater vehicle to be highly mobile at a long range from the receiving system. Further, the underwater vehicle may transmit data in real time and at a relatively high bandwidth. In a particular embodiment, the communication system may utilize pulsed laser signal transmissions to increase a signal-to-noise ratio of communication signals sent from the underwater vehicle.

In a particular embodiment, a system includes a collector configured to direct wave energy toward a collection region at an interior of the collector. The collector includes transparent portions that are at least partially transparent to the wave energy. The transparent portions are arranged such that wave energy from multiple directions can pass into the interior of the collector. The collector also includes reflective portions that are at least partially reflective of the wave energy. The reflective portions are arranged such that at least a portion of the wave energy that passes into the interior of the collector is reflected toward the collection region. The system also includes a receiver disposed in the collection region to receive the wave energy that is reflected toward the collection region.

In a particular embodiment, a method includes directing wave energy toward a collection region inside a collector by receiving the wave energy from outside the collector through an at least partially transparent portion of the collector and reflecting the wave energy toward the collection region using an at least partially reflective portion of the collector. The method also includes receiving the wave energy at a receiver disposed in the collection region.

In a particular embodiment, a system includes an optical fiber having a core, a cladding and a side region that is substantially transparent to a selected range of wavelengths of light. The system also includes a light pump to inject pump light into the core via an end of the optical fiber. Interaction of signal light received via the side region, the pump light, and a medium of the optical fiber generates a collected light signal.

The features, functions, and advantages that have been described can be achieved independently in various embodiments or may be combined in yet other embodiments, further details of which are disclosed with reference to the following description and drawings.

DETAILED DESCRIPTION

According to an illustrative embodiment, communication systems and methods that are capable of real-time, high-bandwidth communications are provided. The communication systems may utilize omni-directional or multidirectional signal collectors. For example, a particular signal collector may collect wave energy, such as light, from multiple directions and direct the wave energy to a receiver. The receiver may include an interface that facilitates transferring the wave-energy from propagating in free-space to propagating along a tether that tethers the collector to the receiving system. Accordingly, the communication systems may use relatively short-range, free-space wave energy transmissions to enable the real-time, high-bandwidth communications.

Figure 1A:
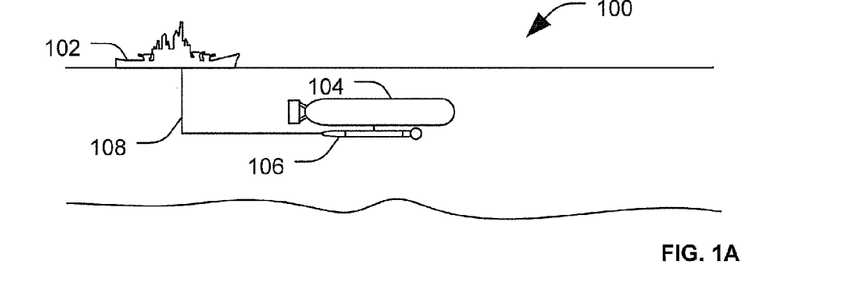
FIGS. 1A-1C are schematic diagrams illustrating side-views of a particular embodiment of a light-based communication system.
Figure 1B:
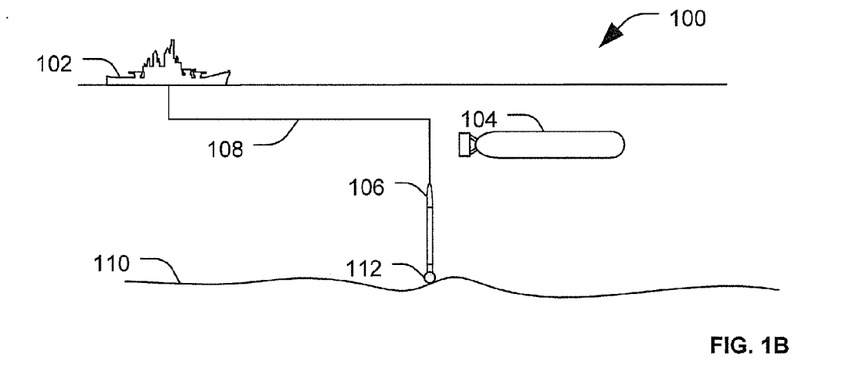
Figure 1C:
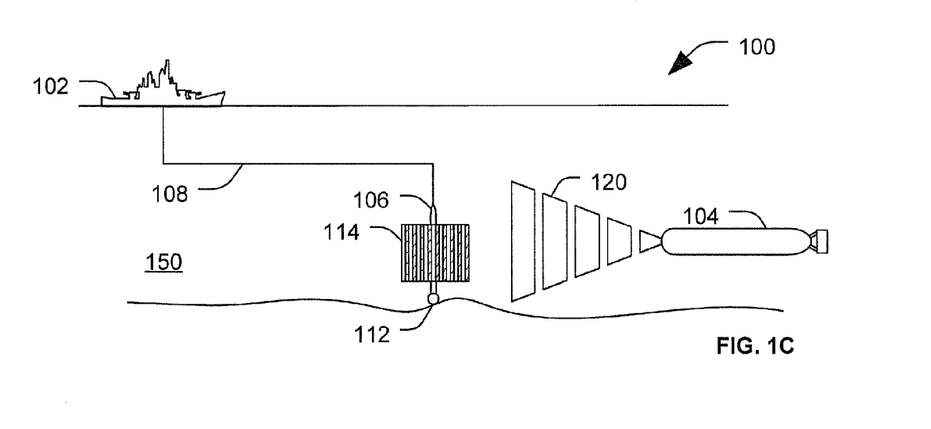

FIGS. 1A-1C are schematic diagrams illustrating side-views of a particular embodiment of a light-based communication system. In particular, FIGS. 1A-1C illustrate deploying and utilizing a communication system 100. The communication system 100 may enable long-range, high-mobility, high-bandwidth, real-time communications between a receiving station, such as a surface vehicle 102, and a transmitting station, such as an underwater vehicle 104.

The communication system 100 includes a deployable collector 106. The collector 106 may be coupled to the surface vehicle 102 via an optical fiber 108. As shown in FIG. 1A, during deployment, the collector 106 may also be coupled to the underwater vehicle 104. The underwater vehicle 104 may carry or otherwise propel the collector 106 to an operational area, and, as shown at FIG. 1B, may release the collector 106 at the operational area to accomplish a mission of the underwater vehicle 104. For example, in order to gather data within the operational area, the underwater vehicle 104 may release the collector 106 at or near the operational area and then transition to a data gathering mode.

The collector 106 may remain in the operational area by sinking to a bottom 110 of a body of water (e.g., a seabed) in the operational area, as illustrated in FIG. 1B. For example, the collector 106 may be weighted to cause the collector 106 to stand more or less upright on the bottom 110. To illustrate, the collector 106 may include a pump 112 that is positioned at an end of the collector 106. The pump 112 may weigh the end of the collector 106 causing the end of the collector 106 to be less buoyant than an opposite end of the collector 106.

The pump 112 may be adapted to pump an ambient fluid 150 (such as water) into an inflatable region 114 of the collector 106 to expand the inflatable region 114 and to prepare the collector 106 to receive communication signals from the underwater vehicle 104. As shown in FIG. 1C, after the collector 106 is deployed, the underwater vehicle 104 may be able to move freely, independent of the collector 106 and the optical fiber 108. The underwater vehicle 104 can communicate with the surface vehicle 102 via the collector 106 and the optical fiber 108 using pulsed laser signals 120 to provide real-time information to the surface vehicle 102. The collector 106 utilizes the inflatable region 114 to collect the pulsed laser signals 120 from multiple directions, as described further below, enabling the underwater vehicle 104 to roam freely without concern for the directionality and positioning of the collector 106.

Accordingly, the communication system 100 enables high-bandwidth, real-time communication between the underwater vehicle 104 and surface vehicle 102. The optical fiber 108 and the collector 106 are not coupled to the underwater vehicle 104 during signal transmission, which enables the underwater vehicle 104 to roam freely of the optical fiber 108 and the collector 106. Accordingly, the communication system 100 provides the underwater vehicle 104 with high mobility.

Figure 2:
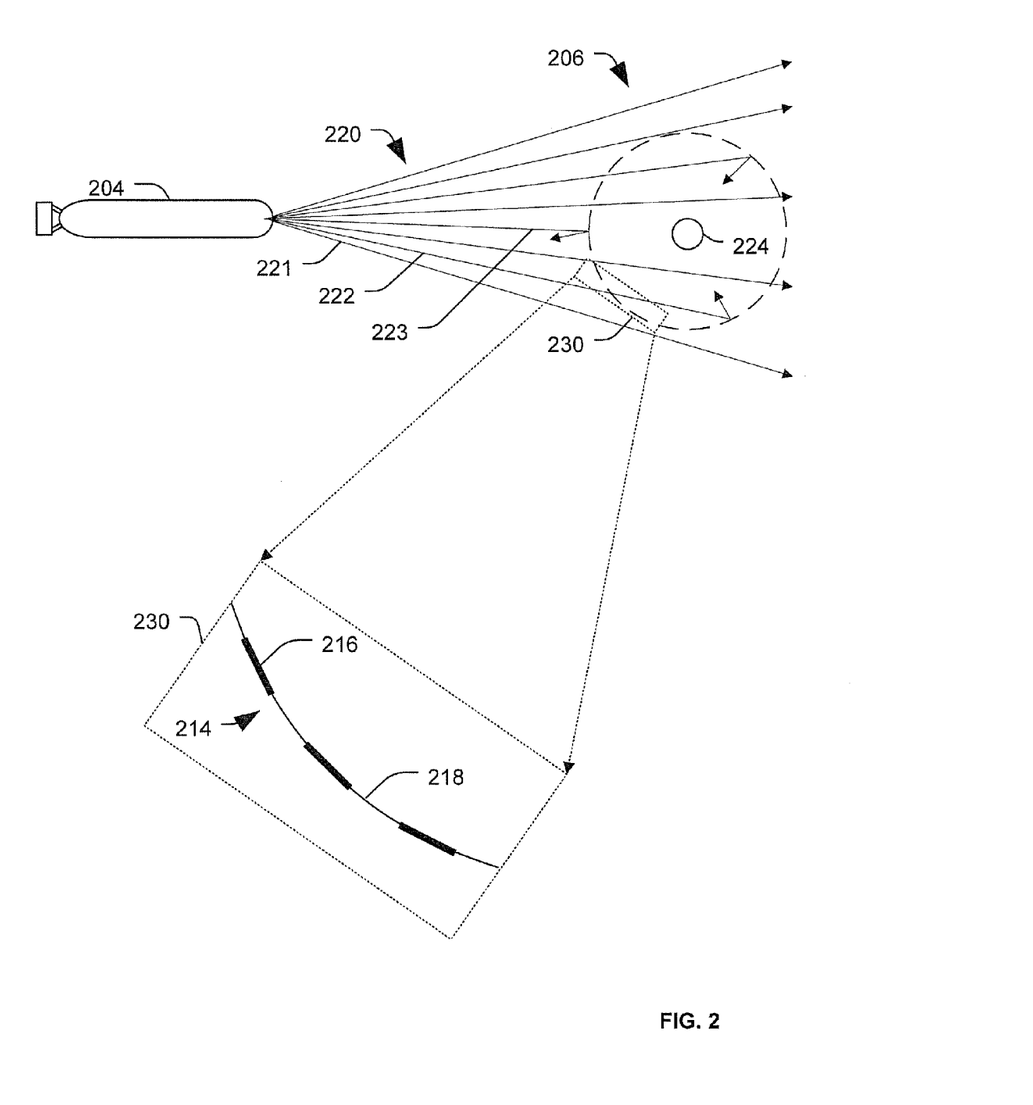
FIG. 2 is a schematic diagram illustrating a top-view of a portion of a particular embodiment of a wave energy-based communication system.

FIG. 2 is a schematic diagram illustrating a top-view of a portion of a particular embodiment of a communication system. In particular, FIG. 2 illustrates a schematic top view of an underwater vehicle 204 in communication with a receiving system, such as the surface vehicle 102 of FIGS. 1A-1C, via a collector 206. The collector 206 is shown in a cutaway top view in FIG. 2 to illustrate features of the collector 206.

The underwater vehicle 204 may transmit signals using wave energy 220, such as sound, light, electromagnetic radiation, etc., generally toward the collector 206. As shown in expanded area 230, the collector 206 may include reflective portions 216 and transparent portions 218. The transparent portions 218 may be at least partially transparent to the wave energy 220 transmitted by the underwater vehicle 204. For example, when the wave energy 220 includes pulsed laser communication signals at a particular wavelength, the transparent portions 218 may be at least partially transparent to light at the particular wavelength.

The reflective portions 216 may be at least partially reflective of the wave energy 220 transmitted by the underwater vehicle 204. For example, when the wave energy 220 includes the pulsed laser communication signals having the particular wavelength, the reflective portions 216 may be at least partially reflective of the pulsed laser communication signals at the particular wavelength. Other wave energy types may be used in addition to or instead of the pulsed laser communication signals. To illustrate, electromagnetic radiation, sound waves, or other propagating wave energy communications may be used for the wave energy 220. When the wave energy 220 includes sound waves or other forms of wave energy besides light, the transparent portions 218 may allow at least a portion of the sound waves or other wave energy to pass from exterior of the collector 206 to within the collector 206, and the reflective portions 216 may reflect at least a portion of the sound waves or other wave energy toward a collection region 224 of the collector 206. The collection region 224 refers to an area inside the collector 206 that includes a collection device or component to receive the wave energy 220 and to enable information communicated via the wave energy 220 to be transmitted to a receiving system via a tether. For example, a light receiver, such as the light receiver 300 of FIGS. 3A-3C, may be disposed within the collection region 224 when the wave energy 220 includes light. When the wave energy 220 is not light or is not only light, another type of collection device may be located within the collection region 224. For example, when the wave energy 220 is sound, the collection device may include a microphone or a hydrophone. In yet another example, when the wave energy 220 is electromagnetic radiation, the collection device may include an antenna or another similar device. The collection region 224 may also include structural components to structurally support the collection device or component.

In a particular embodiment, the wave energy 220 may be divided into several portions based on how each portion interacts with the collector 206. For example, a first portion 221 of the wave energy 220 may pass by the collector 206 without interacting with the collector 206 and may be lost. A second portion 222 of the wave energy 220 may pass through the transparent portions 218. The second portion 222 may be reflected by the reflective portions 216 inside the collector 206 toward the collection region 224 of the collector 206. A third portion 223 of the wave energy 220 may be reflected by the reflective portions 216 at an exterior surface of the collector 206 and may be lost.

The transparent portions 218 and the reflective portions 216 may cover a surface 214 of the collector 206 in a predetermined pattern. For example, the transparent portions 218 may be arranged around the collection region 224 such that light from multiple directions can pass into the interior of the collector 206 and the reflective portions 216 may be arranged around the collection region 224 such that at least a portion of the light that passes into the interior of the collector 206 is reflected toward the collection region 224. Although FIG. 2 illustrates the transparent portions 218 and the reflective portions 216 as distinct portions of the collector 206, in an alternate embodiment, the transparent portions 218 and the reflective portions 216 may be combined (i.e., the same). For example, the entire surface 214 of the collector 206 may be partially transparent to and partially reflective of the wave energy 220. For example, the surface 214 of the collector 206 may be a polymer with a thin layer of a metal applied. The thin layer of metal may be partially reflective and partially transparent to the wave energy 220, allowing a portion of the wave energy 220 to enter the collector 206 while another portion of the wave energy 220 is reflected.

In another particular embodiment, the surface 214 of the collector 206 may include a polymer film that forms the substantially transparent portions 218, and a reflective material is coupled to or coated on the polymer film to provide the reflective portions 216. In other embodiments, the reflective portions 216 and the transparent portions 218 may be formed of different materials that are coupled together to form the surface 214 of the collector 206. The predetermined pattern of the transparent portions 218 and the reflective portions 216 may enable the wave energy 220 to be collected and directed toward the collection region 224 regardless of a direction from which the wave energy 220 is transmitted. Thus, as shown in FIG. 2, the underwater vehicle 204 may circle the collector 206 transmitting the wave energy 220 from any direction, and the collector 206 may reflect at least a portion of the wave energy 220 (e.g., the second portion 222) toward the collection region 224 regardless of the relative orientation of the underwater vehicle 204 and the collector 206. Accordingly, the collector 206 provides multi-directional or omni-directional collection of the wave energy 220 to facilitate communications between the underwater vehicle 204 and a receiving system coupled to the collector 206.

The collection region 224 may include an interface that transfers information transmitted via the wave energy 220 in free-space (e.g., using the ambient fluid 150 as a medium) to a communication medium that is able to transport the information to the receiving station, which may be quite distant (e.g., 20 or more km away). For example, the interface in the collection region 224 may include a water-to-fiber interface that enables transfer of the information from a water medium to an optical fiber medium. To illustrate, referring to FIG. 1C, when the pulsed laser signals 120 are used to communicate information between the underwater vehicle 104 and the surface vehicle 102 via the collector 106, the interface may be provided to transition the pulsed laser signals 120 into the optical fiber 108.

Referring back to FIG. 2, the collector 206 may have a generally circular cross section. For example, the collector 206 may be substantially cylindrical or spherical. The transparent portions 218 and the reflective portions 216 may be striped or patterned on a surface of the collector 206 such that, when the collector 206 is inflated, the second portion 222 of the wave energy 220 passes into an interior of the collector 206 through the transparent portions 218 and is reflected off the reflective portions 216 toward the collection region 224.

Accordingly, the collector 206 enables multi-directional or omni-directional collection of the wave energy 220, which may facilitate high-bandwidth, real-time communication between the underwater vehicle 204 and a remote receiving system. The collector 206 may be remote from the underwater vehicle 204 during transmission of information from the underwater vehicle 204, which enables the underwater vehicle 204 to roam freely.

Figure 3A:
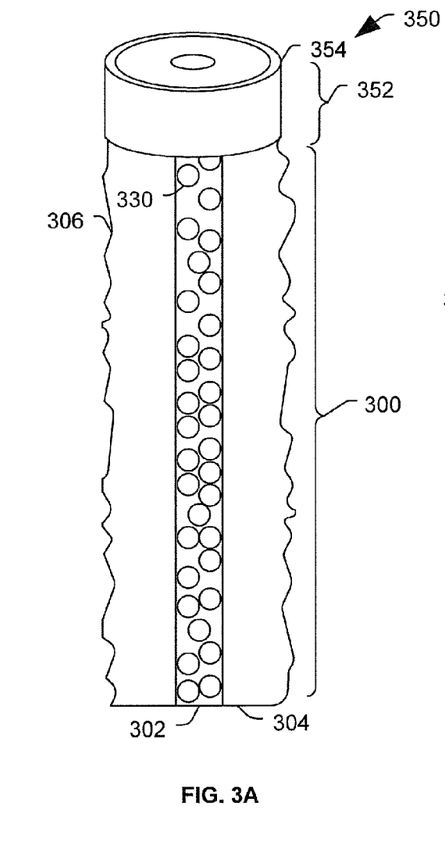
FIGS. 3A-3C are schematic diagrams illustrating sectional views of a particular embodiment of a light receiver.
Figure 3B:
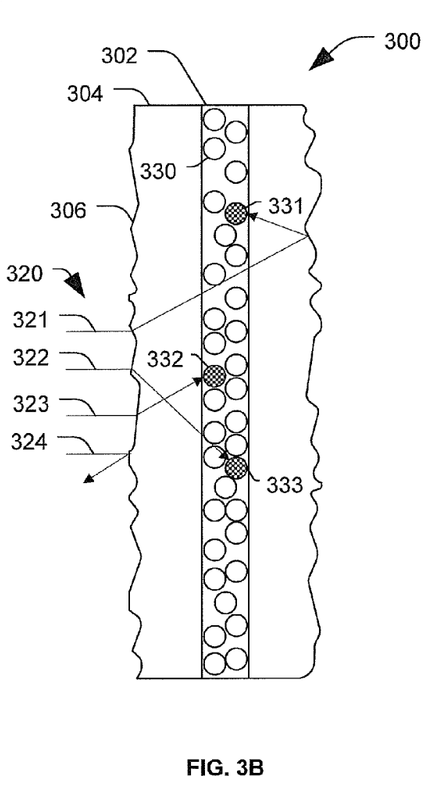
Figure 3C:
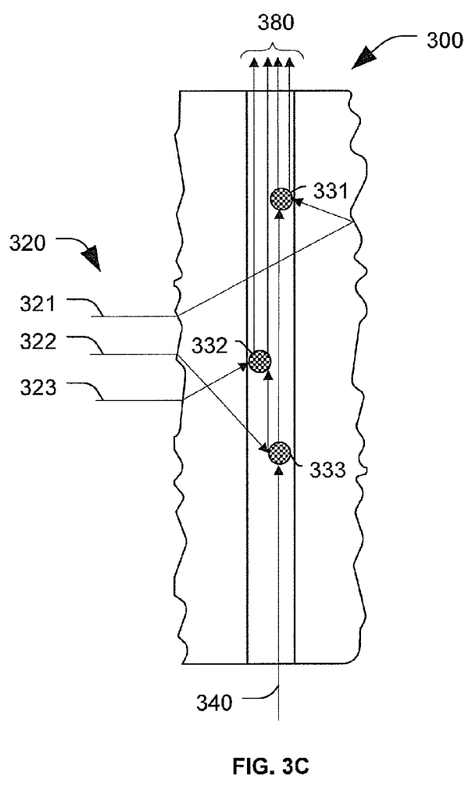

FIGS. 3A-3C are schematic diagrams illustrating sectional views of a particular embodiment of a light receiver 300. The light receiver 300 may act as an interface to receive light from an ambient environment into an optical fiber. For example, the light receiver 300 may be disposed in a collection region of a collector, such as in the collection region 224 of the collector 206 of FIG. 2. In this example, the light receiver 300 may provide an interface between an ambient fluid, such as water, and an optical fiber, such as the optical fiber 108 of FIG. 1.

The light receiver 300 may be a portion of an optical fiber 350. For example, the optical fiber 350 may correspond to the optical fiber 108 of FIGS. 1A-1C. Alternately, the light receiver 300 may include a portion of another optical fiber that is coupled to the optical fiber 108 of FIGS. 1A-1C.

In a particular embodiment, the portion of the optical fiber 350 that includes the light receiver 300 may be uncoated. For example, a first portion 352 of the optical fiber 350 may include a coating 354 that protects the first portion 352 of the optical fiber 350 from an ambient environment. In this example, the light receiver 300 does not include the coating 354. In another embodiment, the light receiver 300 includes the coating 354, and the coating 354 is substantially transparent to light that is transmitted into the light receiver 300. For example, the coating 354 may be transparent to wavelengths of light used for the pulsed laser signals 120 of FIG. 1C.

The light receiver 300 may also include a core 302 and cladding 304. The core 302 may have a refractive index that is larger than a refractive index of the cladding 304. In a particular embodiment, the light receiver 300 includes a dopant 330. For example, the dopant 330 may include particles or ions of a rare-earth element, such as Erbium, Terbium, or other rare-earth elements, either alone or in various combinations.

In a particular embodiment, the light receiver 300 may include an optically-irregular surface 306. For example, an outer surface of the light receiver 300 may be scuffed, textured, etched or otherwise treated to physically roughen the surface. In another example, the surface of the optical fiber 350 or of the light receiver 300 may be physically irregular due to a manufacturing process. In yet another example, the surface may be substantially smooth and may include optical variations (e.g., differences in refractive index) from one location to another location of the light receiver 300. In another example, the optically-irregular surface 306 may include a surface treatment (e.g., a coating, such as epoxy or an index matching oil) that is applied to the light receiver 300.

As illustrated in FIG. 3B, when light, such as signal light 320, encounters the optically-irregular surface 306, light travel direction may change. For example, when the signal light 320 intersects the optically-irregular surface 306, a first portion of the light 324 may be reflected. Other portions of the light, such as a second portion 321, a third portion 322 and a fourth portion 323, may pass through the optically-irregular surface 306 and enter the light receiver 300. Within the light receiver 300, the portions 321-323 of the signal light 320 that enter the light receiver 300 may intersect dopant particles, such as dopant particles 331-333. When a photon of the signal light 320 interacts with (e.g., intersects or is absorbed by) a particular dopant particle, the photon may cause the particular dopant particle to enter an excited state. That is, one or more electrons of the dopant particle may enter a higher level orbital.

Referring to FIG. 3C, pump light 340 may be provided along the core 302 of the light receiver 300. When the pump light 340 interacts with (e.g., intersects or is absorbed by) a particular dopant particle, the particular dopant particle enters an excited state. As described in more detail below, certain dopants, such are Erbium, may have more than one excited state, where the excited states are distinguished as different energy levels. When a dopant particle has more than one excited state, the energy level that the dopant particle enters after interacting with a photon of light is related to a wavelength of the light. Thus, a first photon of light with a first wavelength may excite the dopant particle from an unexcited state (also referred to as a ground state) to a first energy level whereas a second photon of light with a second wavelength may excite the dopant particle from the ground state to a second energy level that is distinct from the first energy level. Certain energy levels of the dopant particle may be unstable. The dopant particle may leave these unstable energy levels almost immediately. However, other energy levels of the dopant particle may be metastable. The dopant particle may remain excited in a metastable energy level for much longer (e.g., orders of magnitude longer than unstable energy levels). When transitioning from an unstable state, the dopant particle may return to the ground state or may relax to a lower energy level that is metastable. Depending on the particular energy level and quantum mechanical variations, the dopant particle may relax (that is return to the ground state or drop to a lower energy state) by a dissipative process (also referred to as releasing a phonon) or by releasing a photon. When a photon is released, the photon has a wavelength that is related to the energy level from which the dopant particle is relaxing and the energy level to which the dopant particle is relaxing.

In a particular embodiment, the pump light 340 may excite the dopant particles 331-333 to a metastable energy level. For example, the pump light 340 may excite the dopant particles 331-333 to a first excited state, from which the dopant particles 331-333 relax to the metastable energy level. The signal light 320 that is received into the light receiver 300 via a side of the light receiver (e.g., through the optically-irregular surface 306), may also excite the dopant particles 331-333 to the metastable energy level. For example, the signal light 320 may excite the dopant particles 331-333 to a second excited state, from which the dopant particles 331-333 relax to the metastable energy level. From the metastable energy level, the dopant particles 331-333 may relax to the ground state (or to a lower energy level) by emitting a photon. Thus, interaction of the pump light 340, the signal light 320 and particles of the dopant 330, such as the dopant particles 331-333, may generate a collected light signal 380 that is transmitted along the core 302 (i.e., along a length of the optical fiber 350). That is, the pump light 340 and the signal light 320 may each interact with the dopant particles 331-333 to stimulate emission of photons to generate the collected light signal 380.

In a particular embodiment, the signal light 320 may include the pulsed laser signals 120 of FIG. 1C. The pump light 340 may be provided from a receiving station, such as the surface vehicle 102 of FIGS. 1A-1C. Interaction of the pump light 340 and the pulsed laser signals in the light receiver 300 may generated the collected light signal 380 that includes information transmitted via the pulsed laser signals.

Accordingly, the light receiver 300 enables collection, redirection, and potentially amplification of pulsed laser signals (or other light) received at a collection region of a collector, such as the collector 106 of FIGS. 1A-1C or the collector 206 of FIG. 2. Additionally, the collector and the light receiver 300 may be able to collect signal light from multiple directions since the signal light 320 enters through a side of the light receiver 300 (e.g., through any side of the light receiver that includes the optically-irregular surface 306). The pump light 340 may be provided from a remote station enabling the collector to be relatively low cost and disposable. Additionally, the signal light 320 may be selected to have a wavelength range that propagates well through water (i.e., the signal light 320 may have relatively low attenuation in water), and the collected light signal 380 may have a different wavelength range that propagates well through optical fiber. Further, the pump light 340 may have a wavelength range that is different from the wavelength range of the signal light 320, different from the wavelength range of the collected light signal 380, or different from the wavelength ranges of both the signal light 320 and the collected light signal 380. For example, the wavelength ranges of the signal light 320, the collected light signal 380 and the pump light 340 may be mutually non-overlapping. Alternately, the wavelength ranges of one or more of the signal light 320, the collected light signal 380 and the pump light 340 may overlap, but may be distinct (e.g., with different central wavelengths).

Figure 4A:
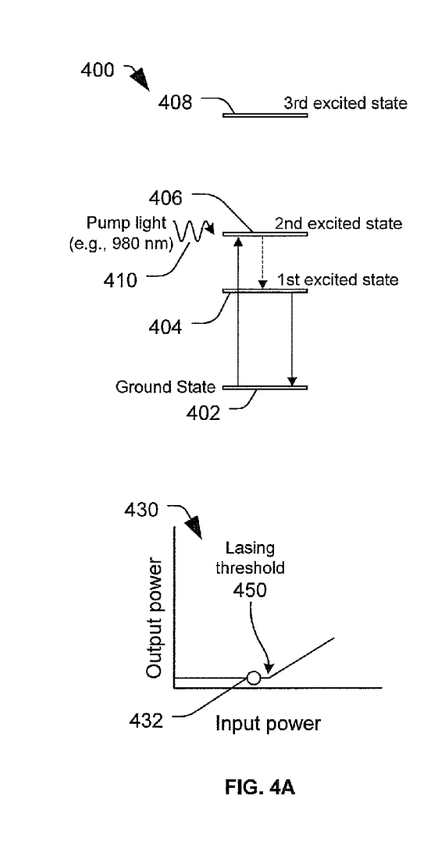
FIGS. 4A-4C are energy level diagrams of a first particular embodiment of a light receiver.
Figure 4B:
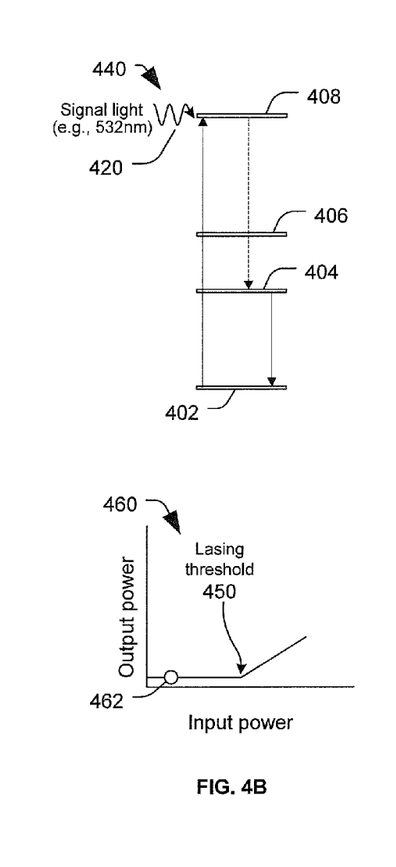
Figure 4C:
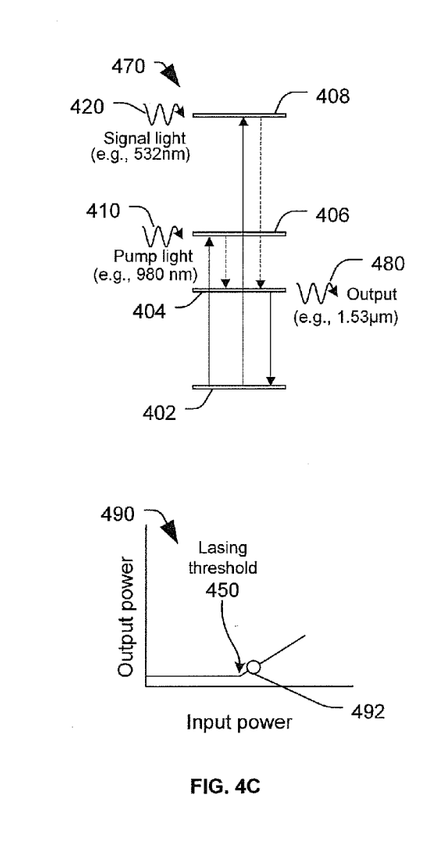

FIGS. 4A-4C are energy level diagrams of a first particular embodiment of a light receiver. FIG. 4A illustrates an energy level diagram 400 of a dopant particle and a corresponding power diagram 430 of the dopant particle. The energy level diagram 400 shows a ground state 402 at which the dopant particle is not excited, a first excited state 404, a second excited state 406, and a third excited state 408.

In a particular embodiment, when pump light 410 interacts with the dopant particle, the dopant particle may be excited to the second excited state 406. The second excited state 406 may be an unstable state. Accordingly, when the dopant particle is excited to the second excited state 406, relaxation processes may occur (such as release of a phonon) that cause the dopant particle to relax to the first excited state 404. That is, relaxation from the second excited state 406 to the first excited state 404 does not release a photon as indicated by the dotted line from the second excited state 406 to the first excited state 404. However, when the dopant particle relaxes from the first excited state 404 to the ground state 402, a photon may be released as indicated by the solid line from the first excited state 404 to the ground state 402. In a particular embodiment, the dopant particle is Erbium, and the second excited state is achieved using pump light 410 with a wavelength of approximately 980 nm.

As shown in the power diagram 430, in the embodiment illustrated in FIG. 4A, the pump light 410 may be input at an input power 432 below a lasing threshold 450 of an optical fiber medium. When the input power 432 is below the lasing threshold 450, the optical fiber medium is not lasing. "Lasing" refers to a state in which output of the optical fiber medium, which generally includes silica glass and may include a dopant, is dominated by stimulated emission rather than spontaneous emission of photons. A "population inversion" occurs when a number of particles of the optical fiber medium that are in a particular excited state from which relaxation occurs by emission of a photon exceeds the number of particles of the optical fiber medium that are at some other energy state (e.g., the ground state 402 or another state from which relaxation occurs without emission of a photon). The lasing threshold 450 is passed when a sufficiently large population inversion is achieved. Thus, the lasing threshold 450 is a point at which a threshold population difference between the number of particles that are in the particular excited state from which relaxation occurs by emission of a photon and the number of particles of the optical fiber medium that are at some other lower energy state is achieved. After the lasing threshold 450 is exceeded, stimulated emission of photons dominates absorption and scattering of photons by the optical fiber medium.

Referring to FIG. 4B, energy levels of the dopant particle during interaction with a signal light 420 are shown in an energy level diagram 440. For example, the signal light 420 may include the pulsed laser signals 120 of FIG. 1, the wave energy 220 of FIG. 2, the signal light 320 of FIGS. 3A-3C, or another signal light. In a particular embodiment, the dopant particle is Erbium, and the signal light 420 has a wavelength of approximately 532 nm.

The signal light 420 may cause the dopant particle to be excited to the third excited state 408. The third excited state 408 may be unstable. Thus, the dopant particle may relax to the first excited state 404 via dissipative processes (such as release of a phonon). As previously described, subsequent relaxation of the dopant particle from the first excited state 404 to the ground state 402 may involve release of a photon.

Power diagram 460 of FIG. 4B shows that input power 462 of the signal light 420 may be below the lasing threshold 450 of the optical fiber medium. Accordingly, in FIG. 4B, the optical fiber medium does not achieve lasing due to the signal light 420 alone.

FIG. 4C illustrates interaction of the signal light 420 and the pump light 410 at a set of dopant particles. As illustrated in energy level diagram 470 of FIG. 4C, the signal light 420 causes excitation of some of the dopant particles to the third excited state 408 and relaxation to the first excited state 404.

The pump light 410 causes excitation of some of the dopant particles to the second excited state 406 and relaxation to the first excited state 404. Relaxation from the first excited state 404 to the ground state 402 occurs with release of a photon. Accordingly, combined input power 492 of the signal light 420 and the pump light 410 is sufficient to cause a population inversion in the set of dopant particles that exceeds the threshold population difference, and therefore the lasing threshold 450 is exceeded as shown in power diagram 490. Thus, when the signal light 420 and the pump light 410 are both present, input power 492 of the system exceeds the lasing threshold 450, as illustrated in FIG. 4C. That is, the signal light 420 excites some particles of the optical fiber medium to the first excited state 404, and the pump light 410 excites other particles of the optical fiber medium to the first excited state 404. Together, the particles excited by the signal light 420 and the particles excited by the pump light 410 are sufficient to achieve the threshold population difference in the optical fiber medium.

Since the input power 492 exceeds the lasing threshold 450, an output signal 480 is generated that corresponds to collected and redirected portions of the signal light 420. The output signal 480 may have a different wavelength than the signal light 420, a different wavelength than the pump light 410, or a different wavelength than the signal light 420 and the pump light 410. For example, when the dopant includes Erbium, the output signal 480 may have a wavelength of approximately 1.53 μm.

Accordingly, the light receiver 300 of FIGS. 3A-3C may collect and redirect signal light, such as the signal light 420, to generate a collected light signal, such as the output signal 480. The output signal 480 of FIG. 4 may correspond to the collected light signal 380 of FIG. 3C. Information communicated via the signal light 420 may be transmitted or transferred into and caused to propagate along the optical fiber by causing the optical fiber to exceed the lasing threshold 450 when the signal light 420 and the pump light 410 interact at one or more dopant particles. Thus, lasing may be turned on or off responsive to receipt of the signal light 420.

Figure 5A:
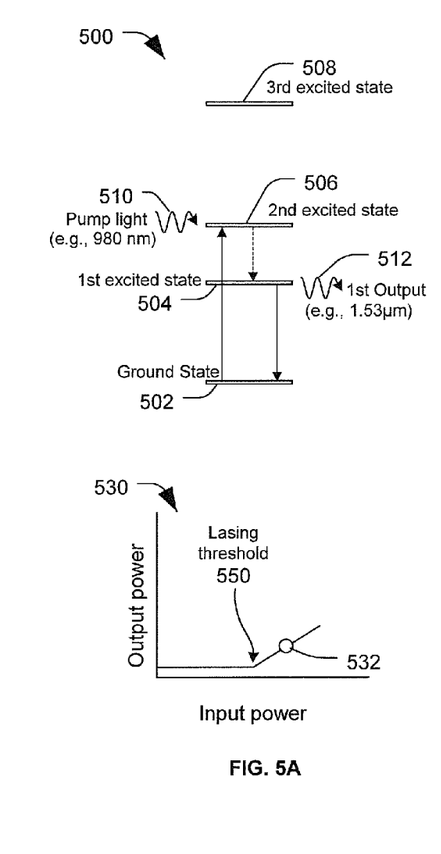
FIGS. 5A-5C are energy level diagrams of a second particular embodiment of a light receiver.
Figure 5B:
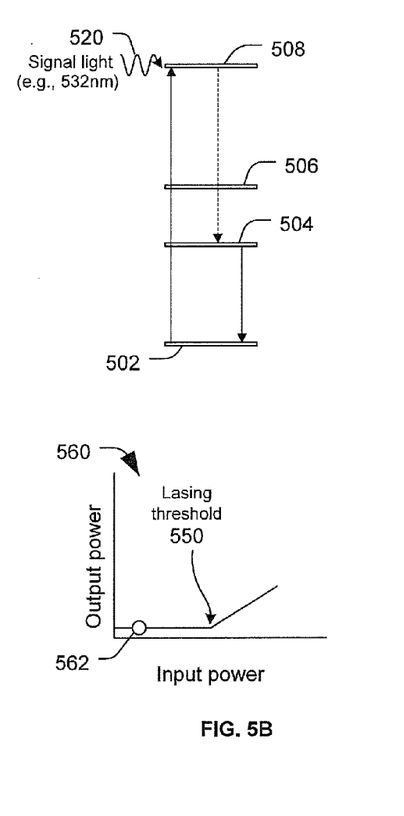
Figure 5C:
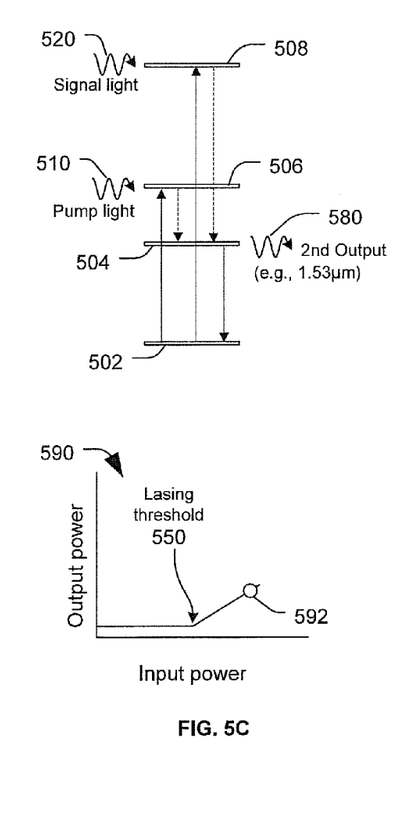

FIGS. 5A-5C are energy level diagrams of a second particular embodiment of a light receiver. FIG. 5A illustrates an energy level diagram 500 of a dopant particle and a corresponding power diagram 530 of the dopant particle. The energy level diagram 500 shows a ground state 502 at which the dopant particle is not excited, a first excited state 504, a second excited state 506, and a third excited state 508. In a particular embodiment, the dopant particle described with reference to FIGS. 5A-5C may correspond to the dopant particle described with reference to FIGS. 4A-4C.

The power diagram 530 shows a lasing threshold 550 of an optical fiber medium and an input power 532 of pump light 510. In the particular embodiment illustrated in FIGS. 5A-5C, the pump light 510 is input at an input power 532 that exceeds the lasing threshold 550. Accordingly, a first output signal 512 is generated in response to the pump light 510. Note that in FIG. 4A-4C, the pump light 410 and the signal light 420 are each individually below the lasing threshold 550. Accordingly, in FIGS. 4A-4C, the optical fiber medium only lases when both the signal light 420 and the pump light 410 are present. However, in FIGS. 5A-5C, the input power 532 of the pump light 510 is above the lasing threshold 550 of the optical fiber medium. Thus, the first output signal 512 is generated in response to the pump light 510 alone.

As shown in power diagram 560 of FIG. 5B, signal light 520 may have an input power 562 that is below the lasing threshold 550. When the signal light 520 and the pump light 510 are both present, a combined input power 592 of the signal light 520 and the pump light 510 is above the lasing threshold 550, as shown in power diagram 590 of FIG. 5C. Thus, a second output signal 580 may be generated. The second output signal 580 is distinct from the first output signal 512. For example, an amplitude of the second output signal 580 may be different than an amplitude of the first output signal 512. To illustrate, the amplitude of the second output signal 580 may be larger than the amplitude of the first output signal 512. In another illustrative example, the amplitude of the second output signal 580 may be modulated responsive to the signal light 520. Thus, whereas FIGS. 4A-4C illustrate operation of the light receiver by switching lasing of the optical fiber medium on and off, FIGS. 5A-5C illustrate operation of the light receiver by changing the amplitude of the output signal from the first output signal 512 to the second output signal 580. In operation, an amplitude modulation technique described with reference to FIGS. 5A-5C may generate an output signal that has a lower signal to noise ratio than a technique that switches lasing on and off, as in FIGS. 4A-4C.

Figure 6:
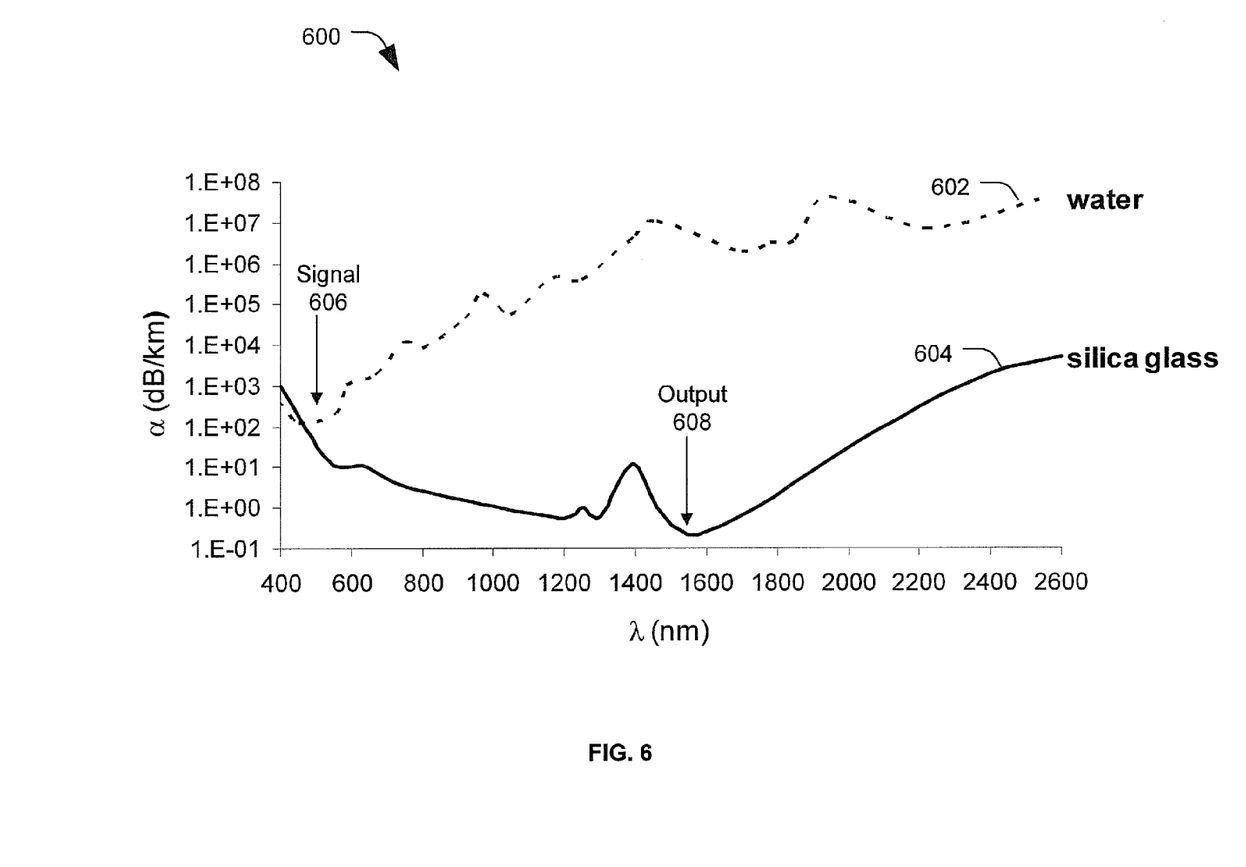
FIG. 6 is graph of a particular embodiment of attenuation per kilometer for various wavelengths of light in different media.

FIG. 6 is a graph 600 illustrating attenuation per kilometer for various wavelengths of light in different media, according to a particular embodiment. In the graph 600, attenuation of various wavelengths of light per kilometer of water is shown as dotted line 602, and attenuation of various wavelengths of light per kilometer of silica glass is shown as line 604. The signal light used for underwater communications (e.g., the pulsed laser signals 120 of FIG. 1, the wave energy 220 of FIG. 2, the signal light 320 of FIGS. 3A-3C, the signal light 420 of FIGS. 4A-4C, or the signal light 520 of FIGS. 5A-5C) may be selected to have low attenuation in water. For example, the signal light may have a wavelength of approximately 532 nm, as shown at 606. An output signal (e.g., the collected light signal 380 of FIG. 3C, the output signal 480 of FIG. 4C, or the second output signal 580 of FIG. 5C) may be generated and communicated via an optical fiber at a wavelength that has low attenuation in optical fiber. For example, the output signal may have a wavelength of approximately 1.53 μm, as shown at 608.

Figure 7:
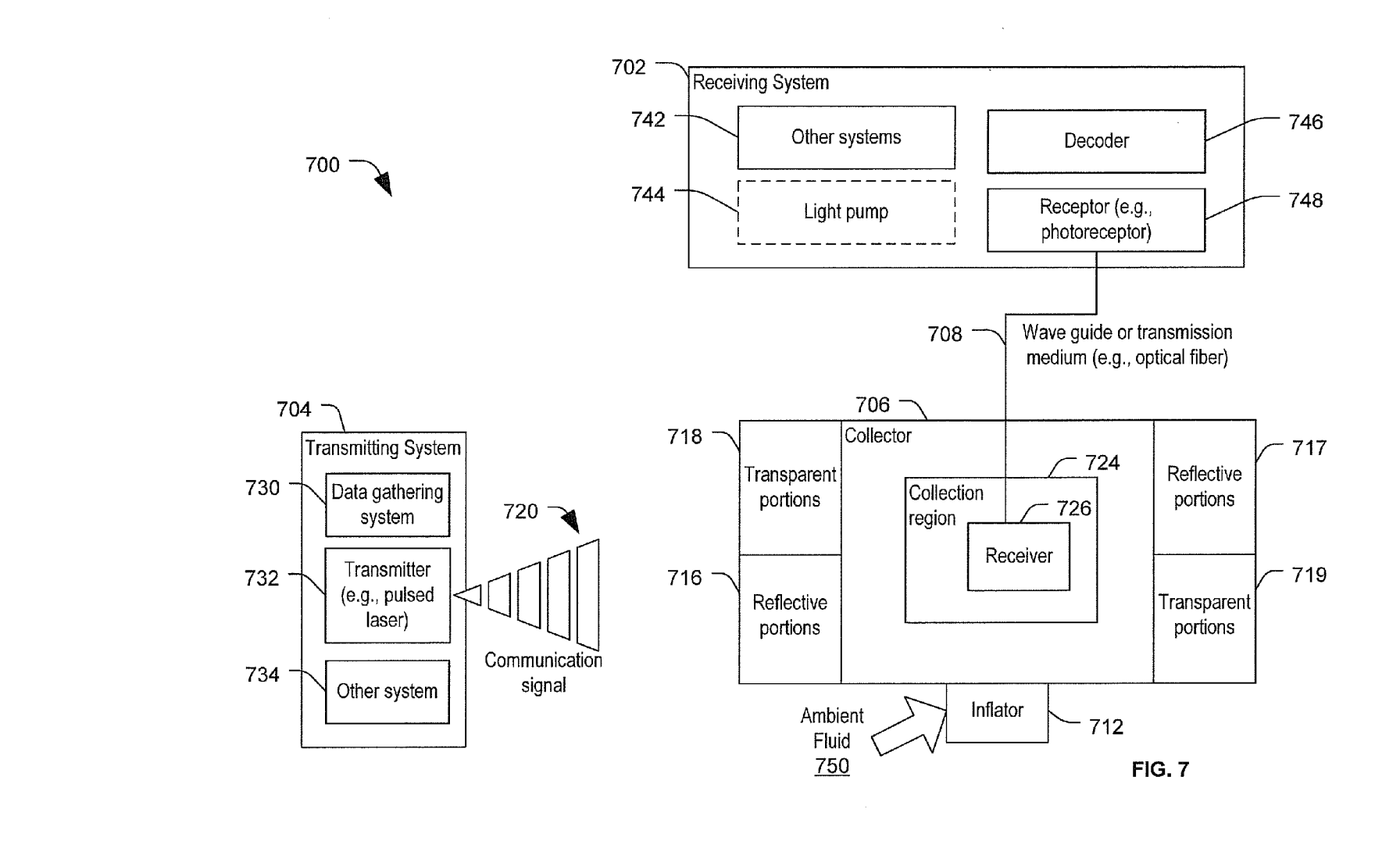
FIG. 7 is block diagram of a particular embodiment of a wave energy-based communication system.

FIG. 7 is block diagram of a particular embodiment of a wave energy-based communication system 700. The communication system 700 includes a receiving system 702, a collector 706, and a transmitting system 704. For example, the receiving system 702 may include a water-based system, a land-based system, an air-based system, or another system that is coupled to the collector 706 via a wave guide or other transmission medium 708, such as an optical fiber. To illustrate, the receiving system 702 may be the surface vehicle 102 of FIG. 1 or a component of the surface vehicle 102.

The transmitting system 704 may be operable to move in a vicinity of the collector 706 and to transmit communication signals 720 generally directed toward the collector 706. For example, the transmitting system 704 may be the underwater vehicle 104 of FIG. 1 or the underwater vehicle 204 of FIG. 2. The collector 706 may be adapted to collect at least a portion of the communication signals 720 at a collection region 724 of the collector 706 using a receiver 726. For example, the collector 706 may be the collector 106 of FIG. 1 or the collector 206 of FIG. 2. The receiver 726 may include an interface to receive communication signals from an ambient fluid 750 into the wave guide or other transmission medium 708 for communication or transmission to the receiving system 702. For example, the receiver 726 may include the light receiver 300 of FIGS. 3A-3C.

In a particular embodiment, the transmitting system 704 may include a transmitter 732 that transmits the communication signal 720. For example, the transmitter 732 may include a pulsed laser. The transmitting system 704 may also include a data gathering system 730 that collects information to be transmitted via the transmitter 732 to the receiving system 702. The transmitting system 704 may also include other systems 734, such as one or more, including various combinations, of the following: a navigation system, a receiving system (e.g., to receive instructions), a processor, or other processing systems that pre-process information gathered by the data gathering system 730 before transmission of the information via the transmitter 732, and so forth.

The collector 706 may include transparent portions 718, 719 and reflective portions 716, 717. The transparent portions 718, 719 and reflective portions 716, 717 may be arranged to allow at least a portion of the communication signals 720 to pass through the transparent portions 718, 719 and to be reflected by the reflective portions 716, 717 toward the collection region 724 of the collector 706. An interface to the wave guide or other transmission medium 708 may be provided in the collection region 724. For example, the receiver 726 may include an interface that facilitates transferring information transmitted via the communication signals 720 from propagating in free-space to propagating along the wave guide or other transmission medium 708. The portion of the communication signals 720 received at the receiver 726 may be transferred into the wave guide or other transmission medium 708 and sent to the receiving system 702, for example, as a collected light signal.

The collector 706 may be relatively small and light-weight. In a particular embodiment, the collector 706 is designed to be inexpensive and disposable. For example, the collector 706 may include a polymer film that is coated with the reflective portions 716, 717 and may include an inflator 712 that pumps the ambient fluid 750 into the collector 706 to inflate the collector 706 to enable the communication signals 720 to be received in the collection region 724.

The receiving system 702 may include a receptor 748, such as a photoreceptor, that is adapted to receive information communicated via the wave guide or other transmission medium 708. The receptor 748 may provide the information communicated via the wave guide or other transmission medium 708 to a decoder 746 (e.g., as electrical signals). The decoder 746 may extract or decode the information for use by other systems 742 of the receiving system 702. For example, the other systems 742 may include one or more computing systems. In this example, a computing system may include a processor and tangible, non-transitory, computer-readable media (e.g., one or more computer memory devices). The processor can be implemented using a single-chip processor or using multiple processors. The computer-readable media may include various memory devices, such as registers, cache, volatile memory, and non-volatile memory. For example, the computer-readable media can include cache that is accessible by the processor to rapidly retrieve and store data. The computer-readable medium can include any data storage device that can store data which can thereafter be read by the computing system or by another computing system. Examples of computer-readable media include, but are not limited to: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices.

The computer-readable media may store instructions that are executable by the processor to implement various functions of the receiving system 702. To illustrate, the instructions may be executable by the processor to process, store or further communicate the information received via the communication signal 720 and the wave guide or other transmission medium 708. For example, the instructions may be executable by the processor to use at least a portion of the information communicated via the communication signal 720 and the wave guide or other transmission medium 708 to generate a display including information gathered by the data gathering system 730, such as video gathered by a video camera of the data gathering system 730. Additionally or in the alternative, the other systems 742 may include dedicated hardware implementations, such as application specific integrated circuits, programmable logic arrays and other hardware devices, to implement one or more functions of the receiving system 702. Accordingly, the present system encompasses software, firmware, and hardware implementations.

In a particular embodiment, when the communication signal 720 includes light the wave guide or other transmission medium 708 may include an optical fiber. In this embodiment, the receiving system 702 may include a light pump 744 that is adapted to apply pump light to the optical fiber. For example, the light pump 744 may apply the pump light 340 of FIG. 3C, the pump light 410 of FIGS. 4A and 4C, or the pump light 510 of FIGS. 5A and 5C, to the optical fiber. The pump light may facilitate transition of the communication signal 720 into the optical fiber and communication of information encoded within the communication signal 720 along the optical fiber.

Accordingly, the communication system 700 may enable high-bandwidth, real-time communications between the transmitting system 704 and the receiving system 702. Additionally, the transmitting system 704 may be able to roam freely from the receiving system 702 since the transmitting system 704 is not tied or bound to the wave guide or other transmission medium 708.

Figure 8:
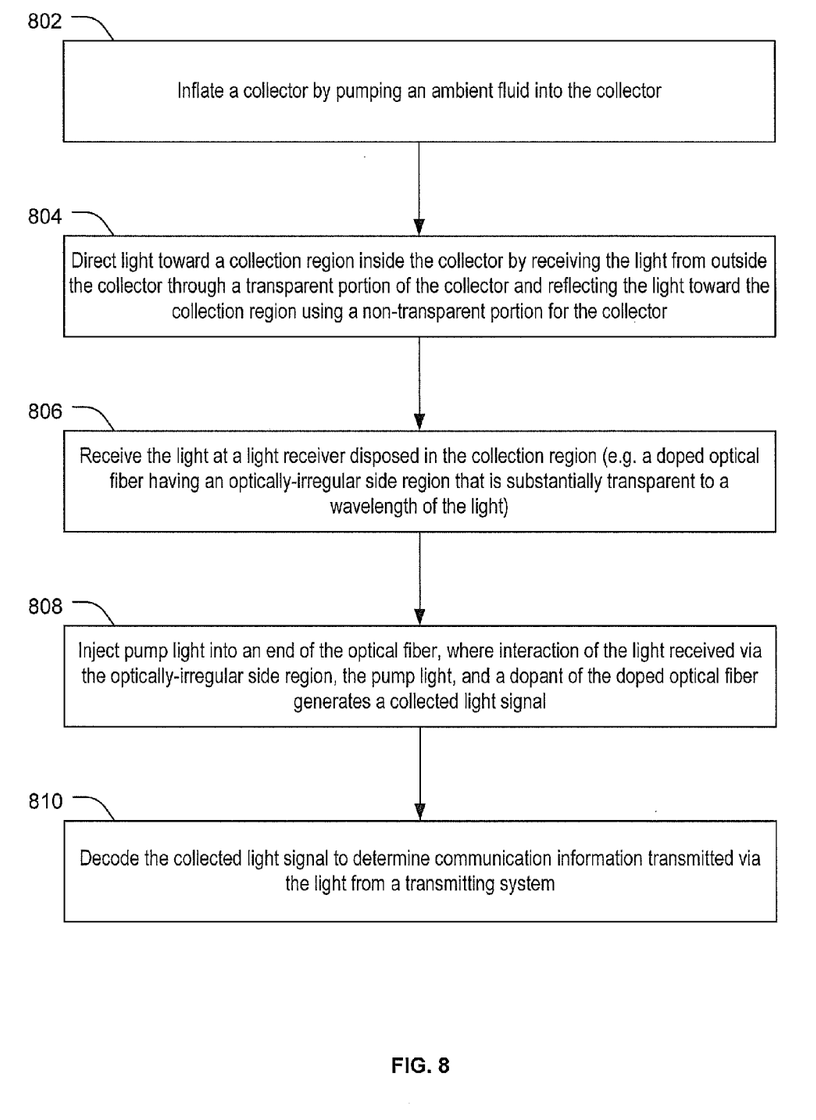
FIG. 8 is flow chart a particular embodiment of a method of light-based communications.

FIG. 8 is flow chart of a particular embodiment of a method of light-based communications. The method includes, at 802, inflating a collector by pumping an ambient fluid into the collector. For example, the ambient fluid 150 of FIG. 1 may be pumped into the collector 106 to inflate the collector 106 when the underwater vehicle 104 is in an operational area. In another example, the ambient fluid 750 of FIG. 7 may be pumped into the collector 706 to inflate the collector 706 when the transmitting system 704 is in an operational area.

The method also includes, at 804, directing light toward a collection region inside the collector by receiving the light from outside the collector through a transparent portion of the collector and reflecting the light toward the collection region using a reflective portion for the collector. For example, the wave energy 220 of FIG. 2 may pass through the transparent portions 218 and may be reflected on an inside surface of the collector 206 by the reflective portions 216 toward the collection region 224. In another example, the communication signal 720 of FIG. 7 may pass through the transparent portions 718 or 719 and may be reflected on an inside surface of the collector 706 by the reflective portions 716 or 717 toward the collection region 724 to be collected and received by the receiver 726.

The method may include, at 806, receiving the light at a light receiver disposed in the collection region. For example, the light receiver 726 may be disposed within the collection region 724 of the collector 706 of FIG. 7. The light receiver may include a doped optical fiber having an optically-irregular side portion that is substantially transparent to a wavelength of light. For example, the light receiver 726 may include the light receiver 300 of FIGS. 3A-3C.

The method may also include, at 808, injecting pump light into an end of the optical fiber. Interaction of the light received via the optically-irregular side portion, the pump light, and a dopant of the doped optical fiber may generate a collected light signal that propagates along the optical fiber to a receiving system. The method may also include, at 810, decoding the collected light signal to determine communication information transmitted via the light from a transmitting system.

Accordingly, the method of FIG. 8 may enable high-bandwidth, real-time communication between the transmitting system, such as an underwater vehicle, and a receiving system, such as a component of a surface vehicle. Information is communicated a relatively short distance through free-space (e.g., through an ambient fluid) during transmission, which enables the transmitting system to roam freely of the optical fiber and the collector. Accordingly, the method of FIG. 8 provides the transmitting system with high mobility.

While the embodiments described above have been largely directed to light-based, underwater communications, other embodiments are also envisioned. For example, light-based communication may be enabled using the system 700 of FIG. 7 in a non-underwater environment. To illustrate, the communication system 700 may be used in an air-based or space-based environment. In a space-based environment, a fluid stored onboard the collector 706, rather than an ambient fluid, may be used to inflate the collector 706. In another example, information may be communicated using wave energy other than light. To illustrate, sound waves, radio waves, or other electromagnetic or non-electromagnetic wave energy may be used to communicate information, which may be gathered from multiple directions using a collector, such as the collector 706 of FIG. 7.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A system, comprising:
    a collector configured to direct wave energy toward a collection region at an interior of the collector, wherein the collector is filled with an ambient fluid, the collector comprising:
        transparent portions that are at least partially transparent to the wave energy, wherein the transparent portions are arranged such that wave energy from multiple directions can pass into the interior of the collector; and
        reflective portions that are at least partially reflective of the wave energy, wherein the reflective portions are arranged such that at least a portion of the wave energy that passes into the interior of the collector is reflected toward the collection region;
    a receiver disposed in the collection region to receive the wave energy that is reflected toward the collection region; and
    an inflator coupled to the collector and configured to inflate the collector with the ambient fluid when the collector is deployed, wherein the ambient fluid comprises a liquid.

2. The system of claim 1, further comprising a light pump coupled to the receiver, wherein the receiver comprises an optical fiber with a clad core.

3. The system of claim 1, wherein the wave energy comprises a pulsed laser communication signal via which communication information is transmitted.

4. The system of claim 3, wherein the wave energy includes light, wherein the receiver comprises an optical fiber having a core and cladding around the core, and wherein the light is able to enter the core along a length of the optical fiber through at least a portion of a side region of the cladding.

5. The system of claim 4, wherein the optical fiber includes an optically-irregular, transparent, side region that enables the light to be received into the optical fiber from multiple directions.

6. The system of claim 5, wherein the optically-irregular, transparent, side region comprises a textured surface.

7. The system of claim 4, wherein the optical fiber includes a rare-earth element dopant.

8. The system of claim 4, further comprising a light pump coupled to the optical fiber, the light pump configured to inject pump light into the optical fiber.

9. The system of claim 8, wherein the light pump injects the pump light into the optical fiber below a lasing threshold of the optical fiber.

10. The system of claim 8, wherein the light pump injects the pump light into the optical fiber above a lasing threshold of the optical fiber.

11. The system of claim 8, further comprising a photoreceptor coupled to the optical fiber, wherein interaction of the light received by the receiver and the pump light with an optical fiber medium of the optical fiber generates a collected light signal that is provided to the photoreceptor via the optical fiber, wherein the collected light signal includes the communication information.

12. The system of claim 11, further comprising a decoder coupled to the photoreceptor to receive signals from the photoreceptor based on the collected light signal detected by the photoreceptor, wherein the decoder is configured to decode the communication information transmitted via the light from a transmitting system based on the signals received from the photoreceptor.

13. A method, comprising:
    inflating a collector by pumping an ambient fluid into the collector;

directing wave energy toward a collection region inside the collector by receiving the wave energy from outside the collector through an at least partially transparent portion of the collector and reflecting the wave energy toward the collection region using an at least partially reflective portion of the collector;

receiving the wave energy at a receiver disposed in the collection region, wherein the wave energy comprises light, and wherein the receiver comprises a doped optical fiber having an optically-irregular side region that is substantially transparent to a wavelength of the light; and injecting pump light into an end of the optical fiber, wherein interaction of the light received via the optically-irregular side region, the pump light, and a dopant of the doped optical fiber generates a collected light signal.

14. The method of claim 13, wherein the ambient fluid is pumped into the collector before directing the wave energy toward the collection region, and wherein the wave energy received at the receiver includes communication information.

15. The method of claim 13, wherein the collector is released from a vehicle prior to inflating the collector.

16. The method of claim 15, wherein at least a portion of the wave energy is received at the receiver from a second vehicle after the collector is released from the vehicle.

17. The method of claim 13, further comprising decoding the collected light signal to determine communication information transmitted via the light from a transmitting system.

18. A system comprising:

an optical fiber having a core, a cladding, and an optically-irregular side region, wherein the optically-irregular side region is substantially transparent to a selected range of wavelengths of light; and a light pump to inject pump light into the core via an end of the optical fiber, wherein interaction of signal light that enters the optical fiber via the optically-irregular side region, the pump light, and a medium of the optical fiber generates a collected light signal.

19. The system of claim 18, wherein the signal light has a first wavelength range, the pump light has a second wavelength range, the collected light signal has a third wavelength range, and wherein the first wavelength range is different than the second wavelength range and is different than the third wavelength range.

20. The system of claim 19, wherein the first wavelength range, the second wavelength range and the third wavelength range are mutually non-overlapping.

* * * * *